R. P. SAFELY.
DIRECTION INDICATOR.
APPLICATION FILED DEC. 19, 1919.
1,353,788. Patented Sept. 21, 1920.
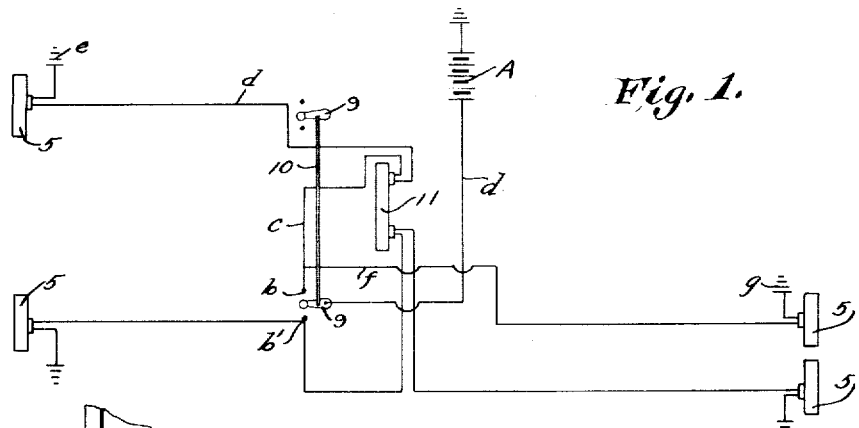
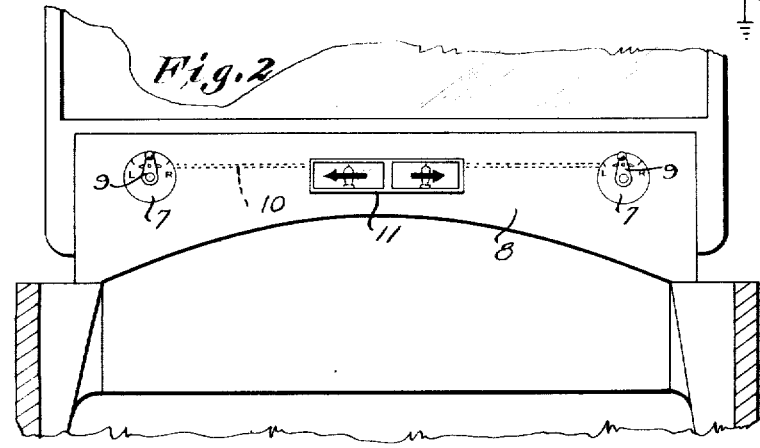
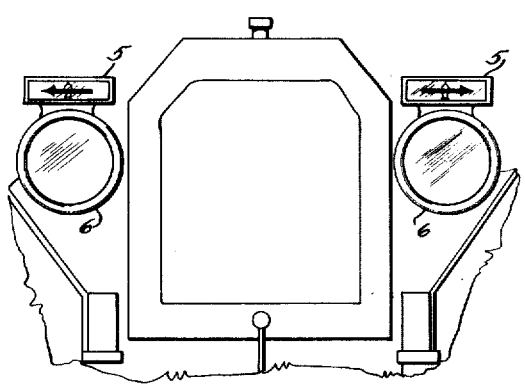
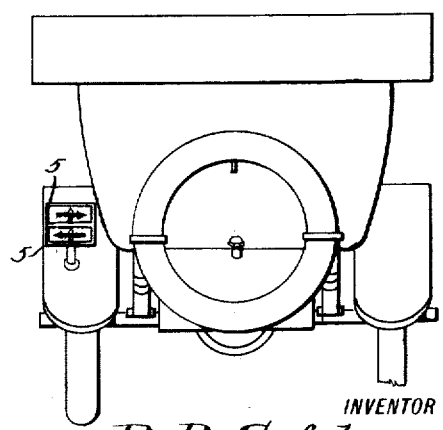
WITNESSES
Wynne Johnson
INVENTOR
R. P. Safely
BY
ATTORNEYS

UNITED STATES PATENT OFFICE.

ROBERT PEAY SAFELY, OF OAKLAND, CALIFORNIA.

DIRECTION-INDICATOR.

1,353,788.   Specification of Letters Patent.   Patented Sept. 21, 1920.

Application filed December 19, 1919. Serial No. 345,958.

*To all whom it may concern:*

Be it known that I, ROBERT PEAY SAFELY, a citizen of the United States, and a resident of Oakland, county of Alameda, and State of California, have invented a new and useful Improvement in Direction-Indicators, of which the following is a full, clear, and exact description.

This invention relates to direction indicators for vehicles and has reference more particularly to an electric direction indicator for motor vehicles which is adapted to be manipulated from the dash or instrument board of the vehicle.

The primary object of the invention is to provide means with which a motor vehicle may be equipped and which can be conveniently manipulated by the driver thereof to indicate to an approaching vehicle the direction that the vehicle is to take, for instance, when making a right hand turn or a left hand turn around corners.

A further object of the invention is to so construct the manipulating or actuating means that the same may be manipulated by either the driver, or an occupant of the vehicle other than the driver, who may be riding for instance on the front seat alongside of the driver.

A still further object of the invention is to so construct the direction indicator that it may be installed on a vehicle as an accessory, and to further so construct the same that it may be manufactured at a comparatively modest cost, and at the same time carry out its intended use with the greatest efficiency.

The accompanying drawing illustrates the preferred embodiment of the invention, which will be referred to in detail as an example of reducing the idea to practice. In said drawing, Figure 1 is a view of the wiring diagram.

Fig. 2 is a cross section through a motor vehicle showing the dash or instrument board in elevation and equipped with the actuating or manipulating means for the indicator.

Fig. 3 is a front view of a motor vehicle illustrating the application of the invention in connection with the head lights thereof, and Fig. 4 is a rear elevation of a motor vehicle illustrating the application of the indicator on the rear thereof.

Referring to the drawings in detail, the idea primarily involves providing a signal, or rather an indicator at the front and rear of the vehicle which may be of a commercial or pleasure type, so that a vehicle approaching from the front or rear may be advised as to the direction to be taken by the vehicle on which the indicator is mounted. For instance, if the driver of the vehicle intends to make a right hand turn the signal on the front and rear will indicate accordingly. If he wishes to make a left hand turn the signal will likewise indicate. In order to realize the advantages of the invention from a commercial stand point the electric equipment, such for instance as the battery or generator of the vehicle is used as a suitable source of electricity with the switches representing the actuating means for the indicator mounted on the instrument board or dash, of the vehicle so that the same may be accessible to the driver so that he may manipulate the same to selectively close the circuit to the signals or indicators on the front and rear of the vehicle. In accordance with the wiring diagram shown in Fig. 1, the lead wire to the indicator system is connected to the storage battery of the vehicle with the signal or indicator lights connected in series. Of course this need not be controlling in every instance, as the same may be likewise connected in parallel should occasion demand. The indicators or signals *per se* preferably comprise a light housing such as 5 which is superimposed upon the road lights or head lights 6 of the vehicle, and associated with the rear road light of the vehicle. These light housings represent an oblong casing which may be made of metal or the like with a glass front which may be either colored or plain. These glass fronts are constructed with the representation of an arrow with the point or head thereof pointing in a direction to indicate a right and left hand turn respectively. For instance in the case of the indicators on the front of the vehicle, the arrows will be pointing one to the right and the other to the left. On the rear the light housings are superimposed, one upon the other with the arrows pointing in opposite directions.

Mounted in each housing is a light source such as a small electric bulb which will illuminate the housing and likewise the arrows represented on the glass front thereof.

Each of the right and left light housings may be selectively illuminated by the switches which as previously stated are positioned on the instrument board or dash 8 of the vehicle. These switches preferably comprise a disk shaped backing to which the wires of the electric system of the indicators are connected, and with a switch handle 9 so arranged that the same may be moved to one of three positions, for instance a neutral position in which the circuit will be broken to a position to illuminate the left indicator, and to a position to illuminate the right indicator. In each one of the two last named positions, to wit, the left hand and the right hand position, the circuit will be closed to the respective light sources. For instance, when the switch handle is turned to close the circuit at the position indicated as R to represent the right, the light housing at the right hand front head light with the arrow thereof pointed to the right will be closed to indicate that the vehicle is to make a right hand turn. Simultaneously with the illumination of this indicator the circuit will also be closed to the right hand indicator on the rear of the vehicle. The same condition is controlling when the switch handle is turned to close the circuit in the position to indicate a left hand turn, that is to say the circuit will be closed to the indicator on the left head light and to the indicator representing the left on the rear of the vehicle.

To realize the advantages of a dual control so that the indicator may be operated by either the driver of the vehicle or an occupant of the vehicle other than the driver, the switch 7 is duplicated on both sides of the instrument board. The two switches are connected so that the manipulation of one will also manipulate the other. This is accomplished by means of a rigid bar 10 which extends from one handle 9 to the other handle 9 so that the turning of one handle will automatically turn the other.

The dash or instrument board is also wired and provided with a duplicate set of indicating means such for instance as the light housing 11 which is adapted to support a pair of lights with arrows on the glass fronts of the housing pointing in opposite directions so that when the circuit is closed by the switches 7 to the right hand indicator the light housing on the dash with the arrow pointing to the right will be illuminated and the same with the left hand indicator. It is of course to be understood that the light housings on the instrument board will be illuminated simultaneously with those on the rear fenders and headlights, thus apprising the driver as to the proper functioning of the lights.

In the wiring diagram shown in Fig. 1 in which the lights are connected in series it will be noticed that the source of electricity as stated is supplied from the battery A from which the circuit extends through the lead wire $a$, to the switch handle 9, so that when the handle is turned to the point $b$, the circuit will be closed through the wire $c$, to the light source in the right hand light housing on the dash through this light source through the wire $d$, to the indicator on the right hand head light, where the circuit is completed through the ground $e$. The circuit to the rear right hand turn indicator is closed through the shunt wire $f$, with the ground $g$ completing the circuit. The circuit to the left hand indicators is a duplication of the wiring to the right hand indicators and the same may be closed by turning the switch handle 9 to close the contact at the point $b^1$.

Of course in the diagram shown it will only be necessary to make and break the circuit on one of the switches, regardless of whether the switch handle 9 on the right or left of the bar is operated they will both work in unison thus causing one or the other to make and break the circuit.

Having thus described my invention what I claim as new and desire to secure by Letters Patent is as follows:—

1. In a direction indicator for vehicles, a plurality of light housings on the front and rear of the vehicle with arrows adapted to indicate one or more directions that the vehicle is to take; a light source in each of the housings, a circuit connecting the said light sources, and dual means for selectively making and breaking the circuit to the said light sources comprising a pair of switches mounted on the instrument board of the vehicle, with means connecting the same so that the actuating of one switch will actuate the other switch.

2. In a direction indicator for vehicles, a plurality of light housings on the front and rear of the vehicle adapted to indicate one or more directions that the vehicle is to take, a duplicate set of light housings on the instrument board of the vehicle; a light source in each of the housings, a circuit connecting the said light sources, and dual means for selectively making and breaking the circuit to the said light sources comprising a pair of switches mounted on the instrument board of the vehicle, with means connecting the same so that the actuating of one switch will actuate the other switch, said switches being mounted at remote points on the said instrument board of the vehicle; whereby the same may be presented in convenient manipulating position for the driver of the vehicle or an occupant of the vehicle other than the driver.

ROBT. PEAY SAFELY.